(12) United States Patent
Schluck et al.

(10) Patent No.: US 9,638,276 B2
(45) Date of Patent: May 2, 2017

(54) BRAKE DISC AND METHOD FOR PRODUCING A BRAKE DISC

(75) Inventors: Peter Schluck, Wolfschlugen (DE); Michael Honer, Gerlingen (DE); Thomas Kiedrowski, Sersheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/117,379

(22) PCT Filed: Mar. 14, 2012

(86) PCT No.: PCT/EP2012/054434
§ 371 (c)(1),
(2), (4) Date: Nov. 13, 2013

(87) PCT Pub. No.: WO2012/156114
PCT Pub. Date: Nov. 22, 2012

(65) Prior Publication Data
US 2014/0262642 A1    Sep. 18, 2014

(30) Foreign Application Priority Data

May 13, 2011    (DE) .................. 10 2011 075 821

(51) Int. Cl.
*F16D 65/12*    (2006.01)
*B05D 1/02*    (2006.01)
(Continued)

(52) U.S. Cl.
CPC ............. *F16D 65/127* (2013.01); *B05D 1/02* (2013.01); *B23K 26/0066* (2013.01);
(Continued)

(58) Field of Classification Search
CPC ..... F16F 65/127; B05D 1/02; B23K 26/0081; B23K 26/0078; B23K 26/0066;
(Continued)

(56) References Cited

U.S. PATENT DOCUMENTS 1,720,815 A * 7/1929 Bendix ................ F16D 69/027
188/218 R
5,017,423 A * 5/1991 Bossmann et al. ........... 442/327
(Continued)

FOREIGN PATENT DOCUMENTS

DE    100 56 161 A1    5/2002
DE    10 2007 020 891 A1    11/2008
(Continued)

OTHER PUBLICATIONS

International Search Report corresponding to PCT Application No. PCT/EP2012/054434, mailed Jun. 28, 2012 (German and English language document) (6 pages).

*Primary Examiner* — Thomas J Williams
*Assistant Examiner* — Mariano Sy
(74) *Attorney, Agent, or Firm* — Maginot, Moore & Beck LLP

(57) ABSTRACT

A brake disc includes a basic body with at least one contact surface that has a wearing coat applied thereon. The at least one contact surface of the basic body is pretreated to realize the bond between the wearing coat and the basic body. The at least one pretreated contact surface of the basic body has a surface topography that is modified by laser irradiation and has at least one predetermined parameter. A method produces the brake disc.

4 Claims, 2 Drawing Sheets

(51) Int. Cl.
  *B23K 26/00* (2014.01)
  *F16D 65/02* (2006.01)
  *F16D 69/00* (2006.01)

(52) U.S. Cl.
  CPC ...... *B23K 26/0078* (2013.01); *B23K 26/0081* (2013.01); *F16D 2065/132* (2013.01); *F16D 2069/005* (2013.01); *F16D 2250/0046* (2013.01)

(58) Field of Classification Search
  CPC ....... C23C 4/02; C23C 4/06; F16D 2065/132; F16D 2069/005; F16D 2250/0046
  USPC ...... 188/218 XL, 251 A; 427/554, 449, 446, 427/451, 455, 456, 307; 428/687
  See application file for complete search history.

(56) References Cited

U.S. PATENT DOCUMENTS

| | | | |
|---|---|---|---|
| 5,499,668 A * | 3/1996 | Katayama | B08B 7/0042 134/1 |
| 5,629,101 A | 5/1997 | Watremez | |
| 6,142,409 A * | 11/2000 | Stewart et al. | 242/615.2 |
| 6,191,384 B1 * | 2/2001 | Hennessey | B23K 26/147 219/121.68 |
| 6,269,669 B1 * | 8/2001 | Matsubara et al. | 72/53 |
| 6,550,132 B1 * | 4/2003 | Tatsumi | 29/611 |
| 7,261,192 B2 * | 8/2007 | Khambekar et al. | 188/218 XL |
| 2003/0136505 A1 * | 7/2003 | Wimmer et al. | 156/272.8 |
| 2005/0064095 A1 * | 3/2005 | Revankar | C23C 24/10 427/189 |
| 2007/0068750 A1 * | 3/2007 | Hara et al. | 188/251 A |
| 2007/0286961 A1 * | 12/2007 | Pahle et al. | 427/449 |
| 2008/0196985 A1 * | 8/2008 | Meckel | C23C 14/025 188/218 XL |
| 2009/0317642 A1 * | 12/2009 | Goller et al. | 428/450 |
| 2012/0058363 A1 * | 3/2012 | Verpoort et al. | 428/649 |

FOREIGN PATENT DOCUMENTS

| | | |
|---|---|---|
| DE | 10 2009 003 161 A1 | 11/2010 |
| JP | 01048604 A * | 2/1989 |
| JP | 7-269614 A | 10/1995 |
| JP | 7-269615 A | 10/1995 |
| JP | 2000-82856 A | 3/2003 |
| WO | WO 2005032756 A1 * | 4/2005 |
| WO | 2010/130529 A1 | 11/2010 |

* cited by examiner

BRAKE DISC AND METHOD FOR PRODUCING A BRAKE DISC

This application is a 35 U.S.C. §371 National Stage Application of PCT/EP2012/054434, filed on Mar. 14, 2012, which claims the benefit of priority to Serial No. DE 10 2011 075 821.6, filed on May 13, 2011 in Germany, the disclosures of which are incorporated herein by reference in their entirety.

BACKGROUND

The disclosure is based on a brake disk and on an associated method for producing a brake disk.

Brake disks that are subject to a high degree of wear and associated production methods are known from the prior art. These methods involve applying to a basic body a wearing coat that is much more resistant to wear than the basic body. In order that the applied wearing coat adheres to the basic body, the contact surface of the basic body is pretreated in a prior process. This pretreatment comprises, for example, cleaning the contact surface, applying a layer of adhesion promoter, etc.

For example, a brake disk and a method for producing a brake disk are described in the laid-open patent application DE 10 2007 020 891 A1. The brake disk described comprises a basic body of a base material, which is provided at least on one of its contact surfaces intended for interacting with a brake lining, entirely or in certain portions with a metallic friction coating, which contains wear-reducing hard particles, for example of ceramic, the friction coating being formed as a spray compaction coating. In one production step, the oxide film on the contact surface of the basic body is removed and the contact surface is preheated in order to increase the adhesion of the wearing coat. Subsequently, the wearing coat is sprayed onto the contact surface of the basic body.

This involves mixing a metallic compound with hard particles at high speeds.

A brake disk and a method for producing a brake disk are described in the laid-open patent application DE 100 56 161 A1. The brake disk comprises a basic body with at least one contact surface and at least one wearing coat, applied to the at least one contact surface of the basic body. In one production step, the oxide film or other contaminants on the contact surface of the basic body is/are removed and the contact surface is roughened by means of blasting with fine particles, in order to increase the adhesion of the wearing coat. Subsequently, the wearing coat is sprayed onto the contact surface of the basic body by the flame, arc or plasma spray-coating process.

SUMMARY

By contrast, the brake disk according to the disclosure and the method according to the disclosure for producing a brake disk have the advantage that the brake disk is pretreated such that the at least one contact surface of the basic body has a surface topography modified by laser radiation, with at least one predetermined parameter.

The various predeterminable parameters of the surface topography are understood hereafter as meaning, for example, a structure, a degree of cleanness, a chemical composition, a roughness, etc., of the pretreated contact surface. Thus, for example, individual parameters or a combination of the parameters mentioned may be predetermined for producing a desired surface topography of the contact surface.

In comparison with preheating, a surface topography of the at least one contact surface that has been modified by laser radiation leads to better adhesion between the basic body and the wearing coat. Furthermore, a surface topography of the at least one contact surface that has been modified by laser radiation is less expensive and less complex to realize than the application of a layer of adhesion promoter. Furthermore, by contrast with a modification by means of blasting with fine particles, a surface topography of the at least one contact surface that has been modified by laser radiation is reproducible. A further advantage of laser radiation is that no fine particle inclusions on the contact surface have an adverse effect on the adhesion between the basic body and the wearing coat.

The laser-radiation-based method for modifying a surface topography of at least one contact surface of the metallic and/or ceramic basic body of the brake disk consequently leads advantageously to an increase in the adhesion between the basic body and the wearing coat. Moreover, parameters of the laser radiation, such as for example energy expended and/or intensity and/or dimensioning and/or duration of the radiation, etc., can be specifically controlled and adapted to the existing circumstances and to the at least one predetermined parameter of the surface topography of the contact surface.

Embodiments of the brake disk according to the disclosure comprise a basic body with at least one contact surface, to which a wearing coat has been applied. To realize the bond between the wearing coat and the basic body, the at least one contact surface of the basic body is pretreated. According to the disclosure, at least one predetermined parameter of a surface topography of the at least one contact surface of the basic body is modified by laser radiation.

Embodiments of the method according to the disclosure for producing such a brake disk provide a basic body with at least one contact surface, to which a wearing coat is applied. To realize the bond between the wearing coat and the basic body, the at least one contact surface of the basic body is pretreated. According to the disclosure, at least one predetermined parameter of a surface topography of the at least one contact surface of the basic body is modified by laser radiation.

Advantageous improvements of the brake disk disclosed herein and of the method for producing a brake disk disclosed herein are possible by the measures and developments that are recited in the dependent claims.

It is particularly advantageous that the at least one predetermined parameter of the modified surface topography of the at least one contact surface comprises a predetermined structure and/or a predetermined degree of cleanness and/or a predetermined chemical composition and/or a predetermined roughness. This leads advantageously to a contact surface to which the wearing coat can adhere better. The adhesion of the wearing coat may be improved, for example, by a higher degree of cleanness. A higher degree of cleanness is understood as meaning a low occurrence of deposits, such as for example grease and/or carbon. A further improvement in the adhesion can be achieved by an adaptation of the chemical composition of the contact surface. Furthermore, the adhesion of the wearing coat can be improved by a greater roughness of the contact surface. The improved adhesion of the wearing coat on the contact surface allows the reliability of the braking effect of the brake disk in interaction with corresponding brake linings to be improved. The brake disk according to the disclosure consequently has a contact surface with advantageous parameters of the surface topography, which achieve improved adhesion of the wearing coat, and consequently increase the reliability of the brake disk.

In an advantageous refinement of the brake disk according to the disclosure, the at least one contact surface of the basic body may have a surface worked by laser radiation in a meandering and/or grooved and/or spiraled form. This advantageously makes a uniformly worked contact surface possible.

The basic body of the brake disk according to the disclosure may be made, for example, as a metallic and/or ceramic body. This advantageously makes a great range of possible alloys and compounds that are extremely stable possible, such as for example gray cast iron, cast steel, forged steel, spheroidal graphite cast iron, aluminum, etc.

In a further advantageous refinement of the brake disk according to the disclosure, the wearing coat is sprayed on the at least one modified contact surface of the basic body. The spraying operation advantageously makes it possible for the wearing coat to be made extremely thin. In this way, the material properties of the basic body can be advantageously combined with the material properties of the wearing coat. This means, for example, that the good thermal conductivity of the basic body can be combined with the wear resistance of the wearing coat.

In an advantageous refinement of the method according to the disclosure for producing a brake disk, a structure and/or a degree of cleanness and/or a chemical composition and/or a roughness may be predetermined by the laser radiation as at least one parameter of the modified surface topography of the at least one contact surface. Good preconditions for the adhesion of the wearing coat on the contact surface are created by the predetermined parameter of the modified surface topography, which depends on the properties of the laser radiation that is used. Consequently, many different possibilities of establishing a connection between the wearing coat and the basic body are possible. This makes it possible to select from various material compounds for the wearing coat, which can be adapted to the circumstances.

In an advantageous refinement of the method according to the disclosure for producing a brake disk, the at least one contact surface may be heated and/or melted and/or vaporized and/or cleaned by way of correspondingly settable parameters of the laser radiation. In this way, a number of required preprocessing steps can be carried out at the same time or in parallel. Thus, for example, organic deposits, such as grease, can be removed from the at least one contact surface by the high-energy radiation. Furthermore, a modification of the chemical composition of the surface topography of the contact surface can be realized by the presence of reactive gases. In this way, the contact surface can be advantageously decarburized. Furthermore, a homogenization of the surface topography of the contact surface can be realized by the laser radiation if the at least one contact surface is melted and segregations and/or inclusions in the melt are dissolved. Since the solidification takes place very rapidly by the self-quenching, the alloying elements or impurities advantageously cannot become segregated any longer. This leads to a contact surface that has neither segregations nor inclusions. A further possibility for determining the surface topography of the at least one contact surface is a geometrical modification, which leads to a structuring of the at least one contact surface. The irradiation has the effect of vaporizing part of the contact surface and the combination of melt and vapor that is present can advantageously lead to a change in the surface structure. A surface with great roughness can in this way be produced by adaptation of the laser parameters. It is generally the case here that great roughness can lead to good adhesion of the wearing coat on the contact surface.

Since the laser irradiation makes it possible for multiple pretreatment steps to be carried out simultaneously on the basic body of the brake disk, time and costs can be reduced in particular.

Since the energy expended and/or the intensity and/or the dimensions and/or the duration of irradiation with the laser radiation can be specifically controlled, the laser radiation can be adapted to the existing circumstances and to the predetermined parameter of the surface topography. For example, laser radiation with low energy merely heats up the surface. If more energy is expended, the surface can then be freed of organic deposits. A further increase in energy may lead to the melting, and finally vaporizing, of the contact surface of the basic body. In this way, the parameters of the surface topography of the contact surface can be changed, it being possible for the various pretreatment steps to be carried out separately and/or simultaneously.

In a further advantageous refinement of the method according to the disclosure for producing a brake disk, the laser radiation for the surface working of the at least one contact surface of the basic body is conducted in a meandering and/or grooved and/or spiraled form. This advantageously makes reproducible, uniform and extensive working of the contact surface possible.

In a further advantageous refinement of the method according to the disclosure for producing a brake disk, the wearing coat is sprayed onto the modified surface topography of the contact surface of the basic body. The adhesion of the wearing coat can be advantageously increased by the previously carried out modification of the surface topography of the at least one contact surface of the basic body, giving rise to a large number of connection possibilities, which can be adapted to the material properties and to the circumstances. Thus, the wearing coat may be applied, for example, by high-velocity oxy-fuel spraying (HVOF) and/or atmospheric plasma spraying (APS). Furthermore, spraying operation allows thin wearing coats to be realized.

Exemplary embodiments of the disclosure are represented in the drawing and are explained in more detail in the description that follows. In the drawing, the same reference signs designate components or elements that perform the same or analogous functions.

DETAILED DESCRIPTION

Figure 1:
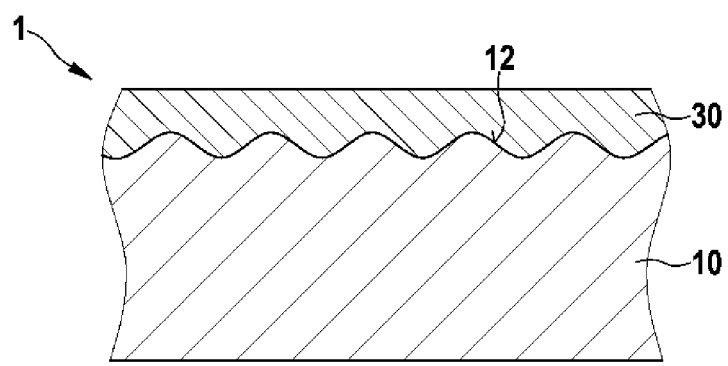
FIG. 1 shows a schematic sectional representation of a detail of an exemplary embodiment of a brake disk according to the disclosure.
Figure 2:
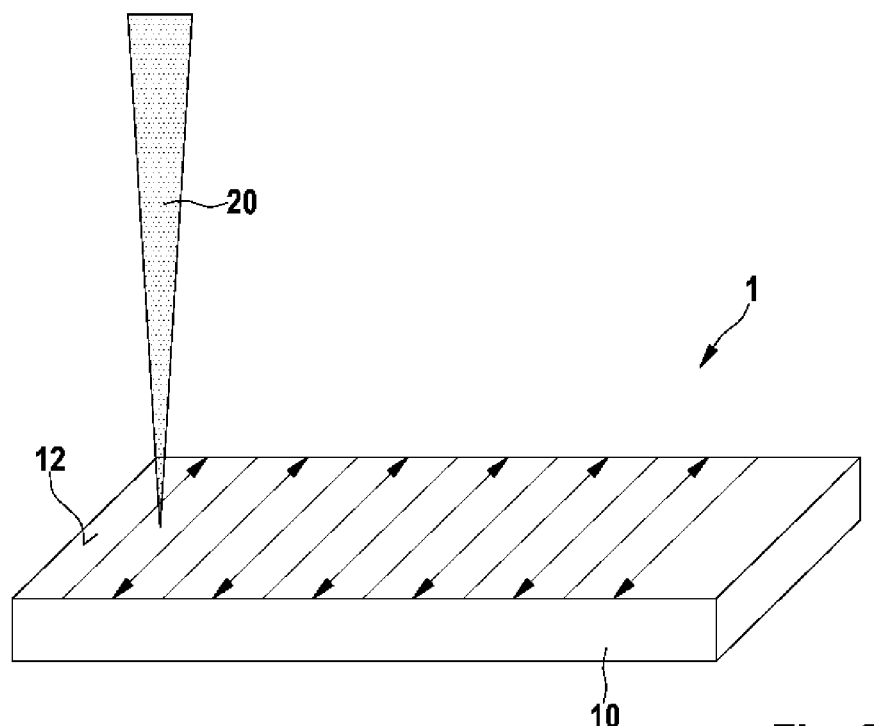
FIG. 2 shows a perspective representation of an operation of pretreating a basic body of the brake disk according to the disclosure that is represented in FIG. 1 with laser radiation.

As can be seen from FIGS. 1 and 2, the exemplary embodiment represented of a brake disk 1 according to the disclosure comprises a basic body 10 with at least one contact surface 12 and at least one wearing coat 30. The basic body 10 is made as a metallic and/or ceramic body.

Furthermore, the basic body 10 is connected at the at least one contact surface 12 to the wearing coat 30. To realize the bond between the wearing coat 30 and the basic body 10, a pretreatment of the surface topography of the at least one contact surface 12 of the basic body 10 is provided. According to the disclosure, the pretreated at least one contact surface 12 of the basic body 10 has a surface topography modified by laser radiation 20, with at least one predetermined parameter.

In the exemplary embodiment represented, the contact surface 12 of the basic body 10 is heated and/or melted and/or vaporized and/or cleaned by the laser radiation 20. Furthermore, the laser radiation 20 is conducted over the contact surface 12 of the basic body 10 in a grooved form. To achieve a modification of the surface topography of the contact surface 12 of the basic body 10, other ways of conducting the laser radiation 20 are possible, such as for example conducting the laser radiation 20 in a meandering and/or spiraled form.

After the completion of the modification of the surface topography of the contact surface 12 of the basic body 10, the wearing coat 30 is sprayed onto the modified surface topography of the contact surface 12 of the basic body 10. The laser radiation 20 allows the desired parameters of the surface topography of the contact surface 12 of the basic body 10 to be implemented easily, quickly and reproducibly. Furthermore, embodiments of the brake disk 1 according to the disclosure in interaction with corresponding brake linings, which interact with the wearing coat 30 of the contact surface 12, make virtually wear-free operation of the brake possible, since the modification of the surface topography of the at least one contact surface 12 has the effect that the wearing coat 30 reliably adheres to the contact surface 12 of the basic body 10 of the brake disk 1.

Figure 3:
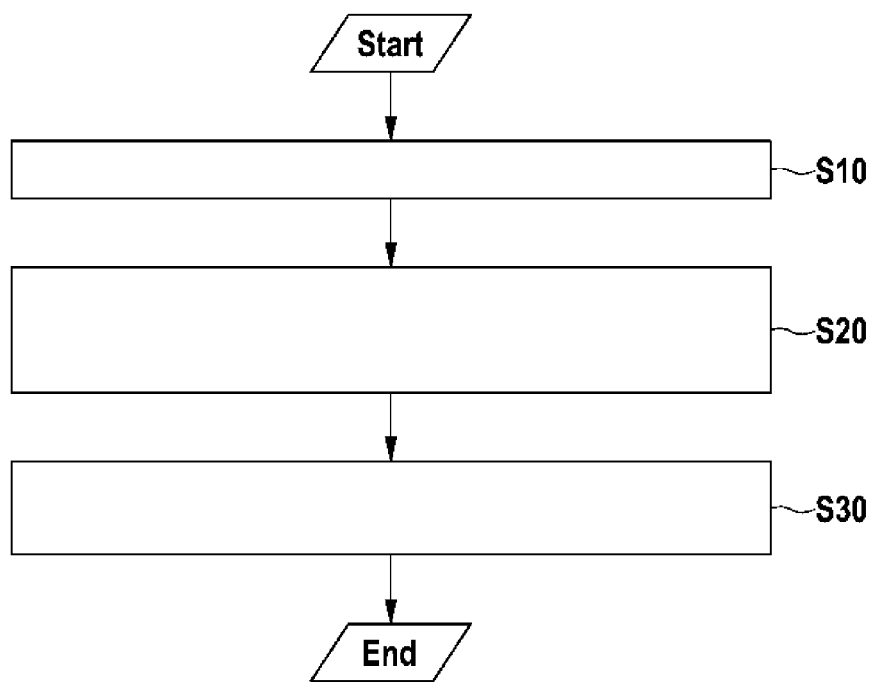
FIG. 3 shows a schematic flow diagram of an exemplary embodiment of a production method according to the disclosure for a brake disk.

As can be seen from FIG. 3, in a method step S10, the basic body 10 is produced with at least one contact surface 12. The basic body 10 may, for example, be cast, forged or otherwise produced from suitable materials, such as gray cast iron, cast steel, forged steel, spheroidal graphite cast iron, aluminum, etc.

In a method step S20, at least one predetermined parameter of the surface topography of the at least one contact surface 12 of the basic body 10 is modified by laser radiation 20. In an advantageous way, the at least one contact surface 12 is heated and/or melted and/or vaporized and/or cleaned by the laser radiation 20. In this way, a number of steps for preprocessing the contact surface 12 of the basic body 10 can be carried out at the same time. For example, organic deposits can be removed, the chemical composition of the surface topography of the contact surface 12 modified and the contact surface 12 decarburized by the high-energy laser radiation 20. Furthermore, the at least one contact surface 12 may be melted by the laser radiation, so that segregations and/or inclusions in the melt are dissolved. Since the solidification takes place very rapidly by the self-quenching, the alloying elements or impurities advantageously cannot become segregated any longer and a homogeneous contact surface 12 is obtained. Moreover, the laser radiation 20 may have the effect of vaporizing part of the contact surface 12. The combination of melt and vapor advantageously leads to a change in the surface structure, so that a surface topography with great roughness can be produced by adaptation of the laser parameters.

In a method step S30, the wearing coat 30 is applied to the basic body 10. Preferably, the wearing coat 30 is sprayed onto the modified surface topography of the contact surface 12 of the basic body 10. The adhesion of the wearing coat 30 can be advantageously increased by the modification of the surface topography of the contact surface 12 of the basic body 10 that is carried out in step S20, giving rise to a large number of connection possibilities, which can be adapted to the material properties and to the circumstances. Thus, the wearing coat may be applied, for example, by high-velocity oxy-fuel spraying (HVOF) and/or atmospheric plasma spraying (APS).

The invention claimed is:

1. A method for producing a brake disk, comprising:
   irradiating at least one contact surface of a basic body of a brake disk with a laser to simultaneously (i) remove organic deposits from the at least one contact surface, (ii) modify a chemical composition of the at least one contact surface by decarburizing the at least one contact surface, and (iii) modify a surface topography of the basic body by increasing a roughness of the at least one contact surface, and
   applying a wearing coat to the at least one contact surface having the at least one modified predetermined parameter,
   wherein the basic body is formed of gray cast iron, and
   wherein the at least one contact surface is decarburized by performing the irradiation in presence of reactive gases.

2. The method for producing a brake disk as claimed in claim 1, wherein the at least one contact surface of the basic body is one or more of heated, melted, vaporized, and cleaned by way of settable parameters of the laser radiation.

3. The method for producing a brake disk as claimed in claim 1, wherein the laser radiation for modifying the surface topography of the at least one contact surface of the basic body is conducted in one or more of a meandering form, a grooved form, and a spiraled form in order to increase the roughness of the at least one contact surface.

4. The method for producing a brake disk as claimed in claim 1, wherein the wearing coat is sprayed onto the at least one modified contact surface of the basic body.

* * * * *